(12) United States Patent
Sviberg

(10) Patent No.: US 10,730,377 B2
(45) Date of Patent: Aug. 4, 2020

(54) VEHICLE HAVING CONVERTIBLE TOP AND SIDE PANEL

(71) Applicant: Webasto SE, Stockdorf (DE)

(72) Inventor: Magnus Sviberg, Stockdorf (DE)

(73) Assignee: WEBASTO SE, Stockdorf (DE)

(*) Notice: Subject to any disclaimer, the term of this patent is extended or adjusted under 35 U.S.C. 154(b) by 2 days.

(21) Appl. No.: 16/018,909

(22) Filed: Jun. 26, 2018

(65) Prior Publication Data
US 2019/0389289 A1 Dec. 26, 2019

(51) Int. Cl.
| | |
|---|---|
| *B60J 1/08* | (2006.01) |
| *B60J 7/19* | (2006.01) |
| *B60J 7/10* | (2006.01) |
| *B60J 7/12* | (2006.01) |
| *B60J 1/00* | (2006.01) |

(52) U.S. Cl.
CPC .............. *B60J 7/19* (2013.01); *B60J 1/005* (2013.01); *B60J 7/102* (2013.01); *B60J 7/1278* (2013.01); *B60J 7/1291* (2013.01)

(58) Field of Classification Search
CPC ... B60J 1/004–1/006; B60J 1/08; B60J 1/085; B60J 7/10; B60J 7/102; B60J 7/104; B60J 10/70; B60J 7/19
USPC ................ 296/146.14, 148, 107.07, 107.12
See application file for complete search history.

(56) References Cited

U.S. PATENT DOCUMENTS

| | | | | |
|---|---|---|---|---|
| 1,151,315 A | * | 8/1915 | Williams | ................ B60J 1/085 296/148 |
| 1,317,208 A | * | 9/1919 | Marvin | ................... B60J 1/085 296/148 |
| 1,535,648 A | * | 4/1925 | Brommer | .................. B60J 1/12 296/148 |
| 6,036,256 A | * | 3/2000 | Hilliard | .................... B60J 1/08 160/182 |

* cited by examiner

*Primary Examiner* — Dennis H Pedder
(74) *Attorney, Agent, or Firm* — Fitch, Even, Tabin & Flannery, LLP

(57) ABSTRACT

A vehicle having a vehicle body which is provided with a manually removable side panel at a longitudinal side of the vehicle, and a top having a top linkage which comprises a link arrangement on either side of the vertical longitudinal center plane of the vehicle, each link arrangement being pivotably mounted on a respective vehicle-attached main bearing. The removable side panel can be secured to at least one element of the top linkage by a manually unlockable locking device.

14 Claims, 12 Drawing Sheets

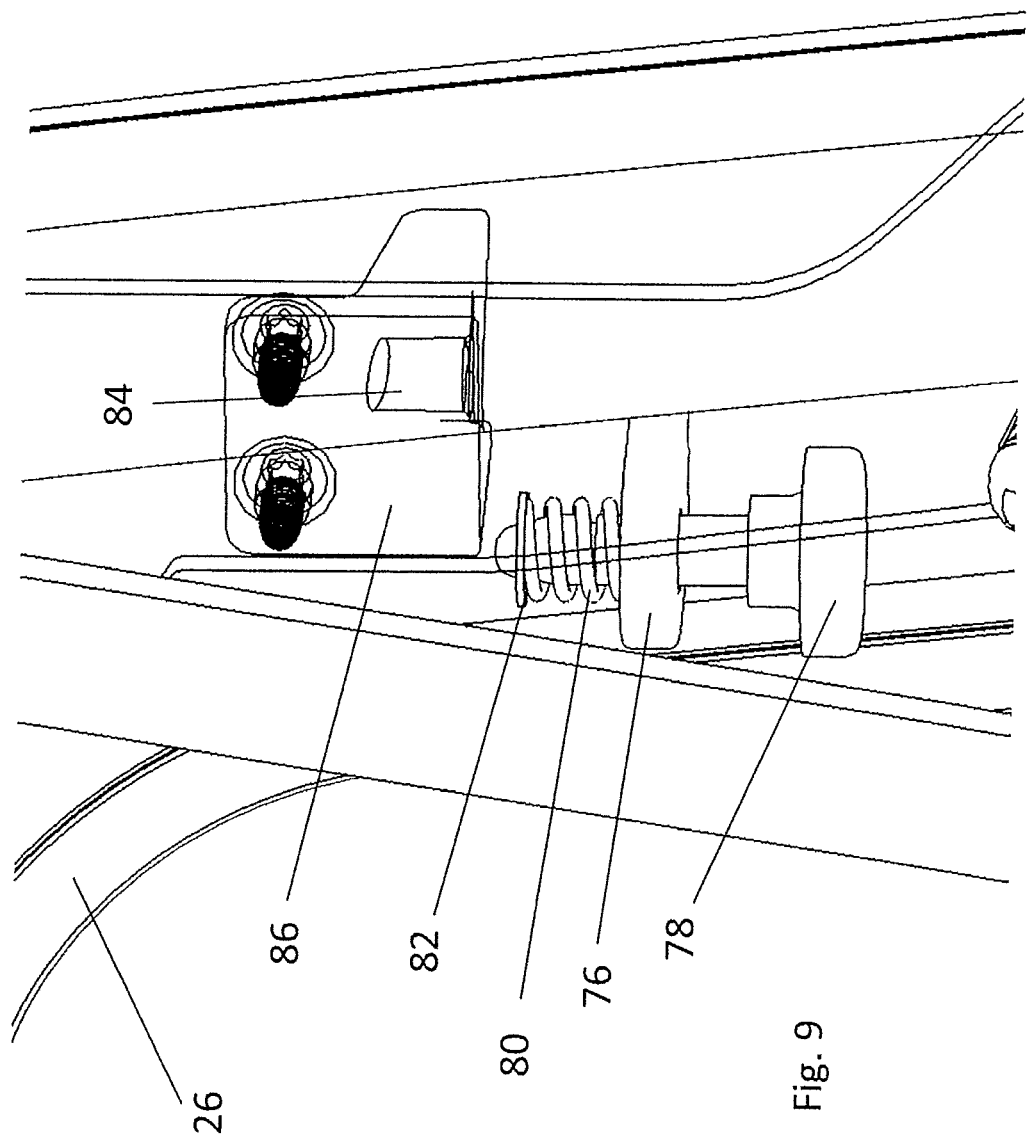

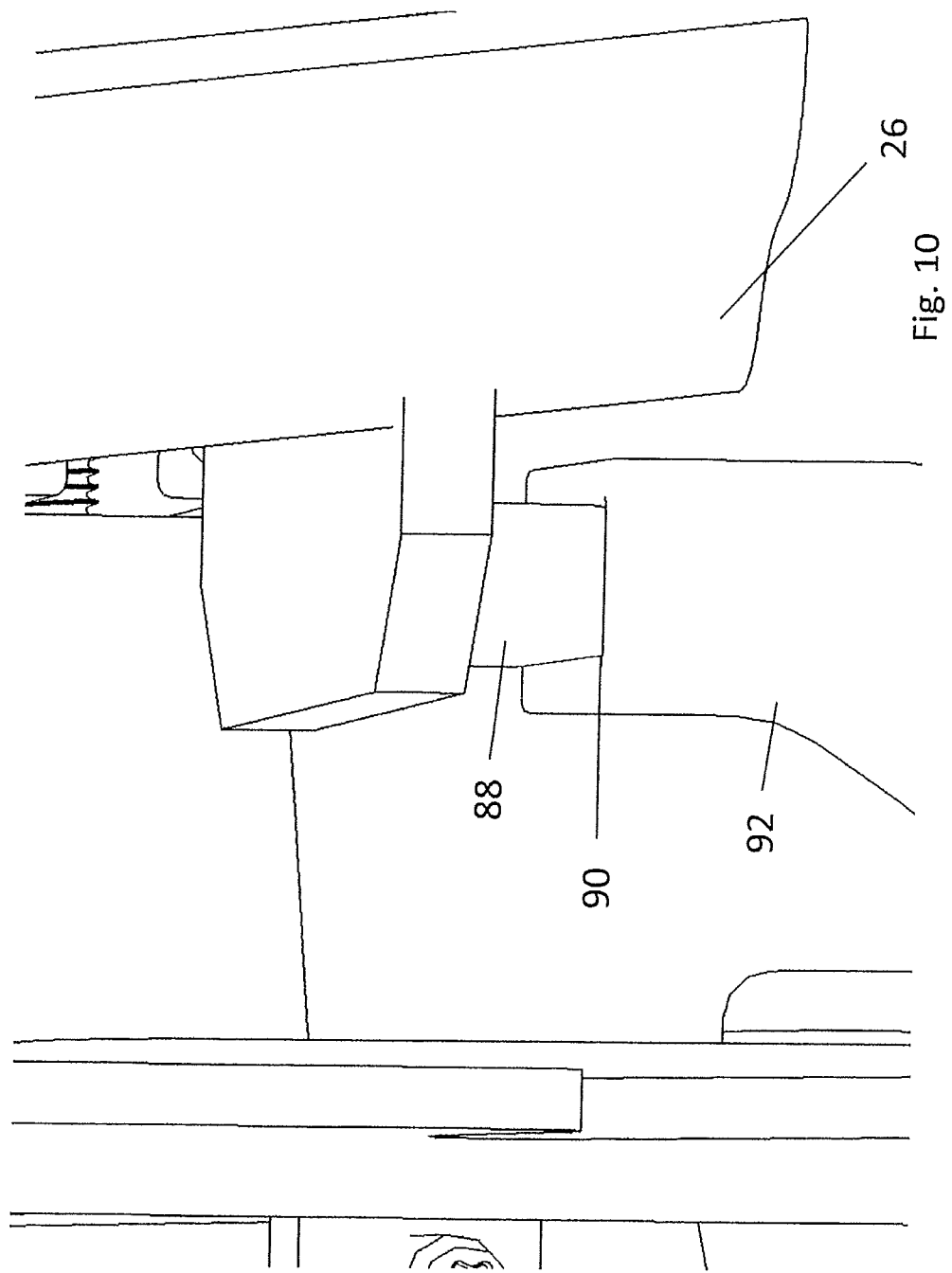

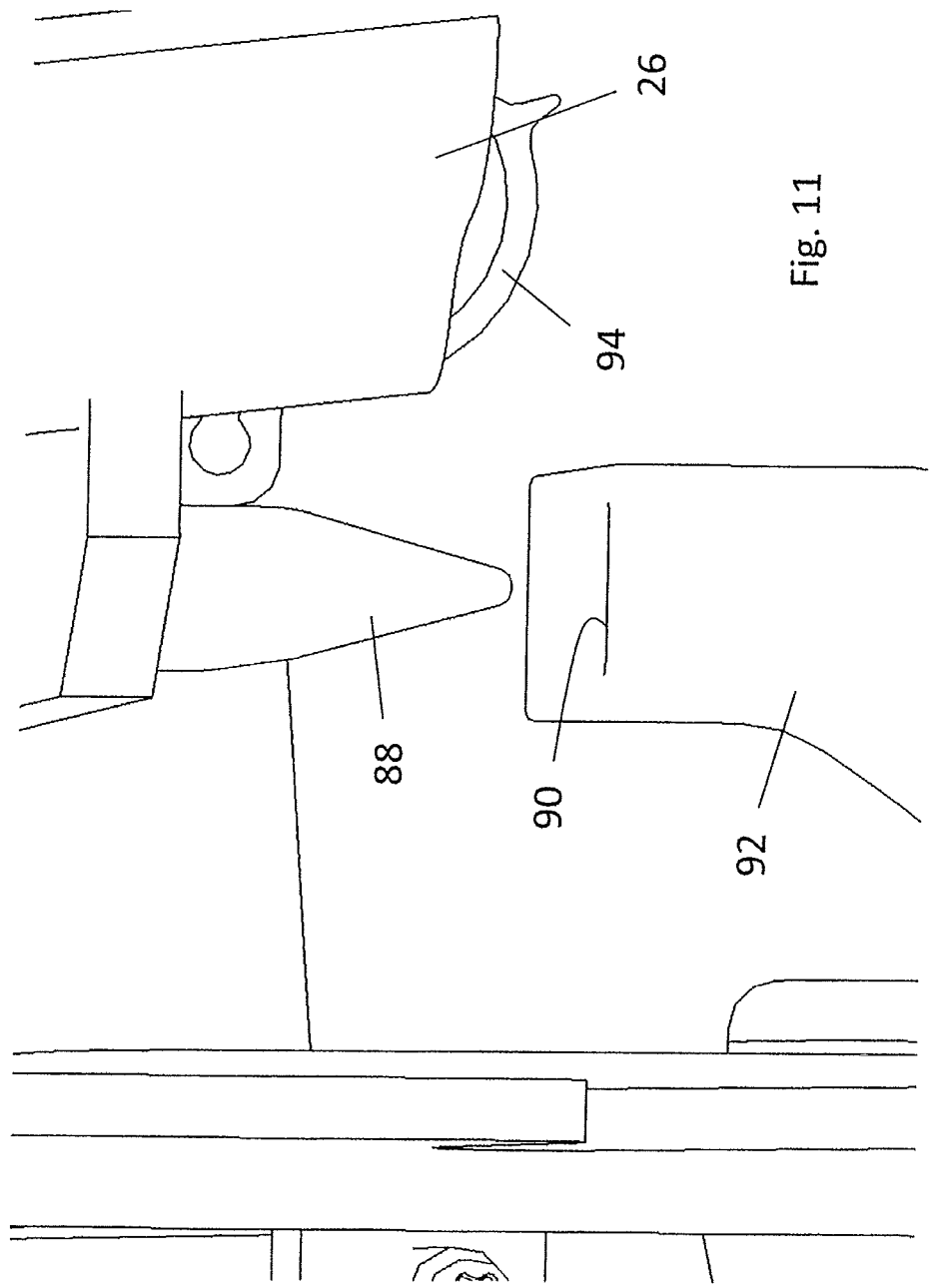

VEHICLE HAVING CONVERTIBLE TOP AND SIDE PANEL

FIELD

A vehicle is proposed having a vehicle body having a manually removable side panel and has a top with a top linkage.

BACKGROUND

From practice, a vehicle is known which a so-called sports utility vehicle (SUV) and which is provided with an openable top which, for being adjusted, has a top linkage mounted on a vehicle-attached main bearing via a respective link arrangement on either side of a vertical longitudinal center plane of the vehicle. Moreover, it is known for a vehicle of this kind to be provided with a manually removable side window which limits a rear-side cargo space of the vehicle. Said side window comprises a support which is attached to a body part of the vehicle in question. Thus, a potential wrong movement of the top is possible when the side window is mounted, which might lead to damage.

SUMMARY OF THE INVENTION

The object of the invention is to provide a vehicle having a top that has a manually removable side panel which largely precludes any faulty actuation of the top.

To attain said object, a vehicle is proposed comprising a vehicle body which is provided with a manually removable side panel at a longitudinal side of the vehicle, and a top having a top linkage which comprises a link arrangement on either side of a vertical longitudinal center plane of the vehicle, each link arrangement being pivotably mounted on a vehicle-attached main bearing, wherein the removable side panel is secured to at least one element of the top linkage by means of a manually unlockable locking device.

In the proposed vehicle, the locking mechanism of the side panel is arranged on the top linkage, which minimizes the risk of faulty actuation of the top. The locking device can be disposed on a support of the side panel which extends in the vertical direction of the vehicle and which may additionally carry a weather strip arrangement by means of which the side panel, which may be an integrated component of the top, can be sealed against an adjacent body part. Owing to the locking device, which can be integrated into the side panel at little cost and with low additional weight, no additional mechanisms for fixing and sealing the side panel to the vehicle body are required.

According to another aspect, the locking device can comprise a spring-loaded locking pin which is pre-loaded into a locking position by means of a spring device. Thus, all that is required to remove the side panel from the vehicle body is to pull the locking pin against the force of the spring device, whereby the side panel is unlocked from the vehicle body. The locking pin can be designed in such a manner that when the side panel is being mounted, the locking pin is moved against the force of the spring device via a ramp disposed on the vehicle body or on the top linkage and automatically enters the locked position when reaching a locking seat formed on a locking counterpart. Thus, the locking pin does not have to be pulled when mounting the side panel.

The locking counterpart is disposed on a link, in particular on a main link of the respective link arrangement, for example, which is pivotably mounted on the vehicle-attached main bearing via a hinge point.

In a preferred embodiment, in order to be able to mount the side panel precisely in a desired position on the vehicle, the side panel has a positioning means (positioning device) which is engaged with a vehicle-attached seat.

For example, the positioning means (positioning device) is a pin which engages into a seat which can be disposed on the respective main bearing.

For the side panel to be continuously positioned clearly in relation to the vehicle body in its longitudinal direction, too, the side panel can have a rib at its lower edge, said rib engaging into a groove of the vehicle. Of course, it is also conceivable for a groove to be disposed at the lower edge of the side panel, said groove being engaged by a rib of the vehicle body.

The groove into which the rib of the side panel engages can be disposed on a rear-side tensioning bracket of the top which is mounted on bilaterally disposed main bearings.

To integrate the side panel into the top, it can have a fixing device at its upper edge for attaching it to a top cover. Said fixing device can comprise a zip.

If the top extends into a rear portion of the vehicle, the side panel can comprise an attaching device at its rear-side edge for connecting it to a vehicle rear element of the top. The vehicle rear element can be formed by the top cover or can also be a rear panel that comprises a rear window. The attaching device for connection to the vehicle rear element can also comprise a zip.

In a specific embodiment of the vehicle, the side panel is a side window arrangement, thus providing a see-through portion of the vehicle.

BRIEF DESCRIPTION OF THE DRAWINGS

An embodiment example of a vehicle having a convertible top and a side window arrangement is illustrated in a schematically simplified manner in the drawing and will be explained in more detail below.

FIG. 9 also shows a view corresponding to FIG. 7, but during removal of the side window arrangement from the vehicle body.

FIG. 10 shows an enlarged view of a positioning means (positioning device) of the side window arrangement in its mounted state.

FIG. 11 shows a view of the positioning means (positioning device) corresponding to FIG. 10, but during removal of the side window arrangement from the vehicle body.

DETAILED DESCRIPTION

Figure 1:
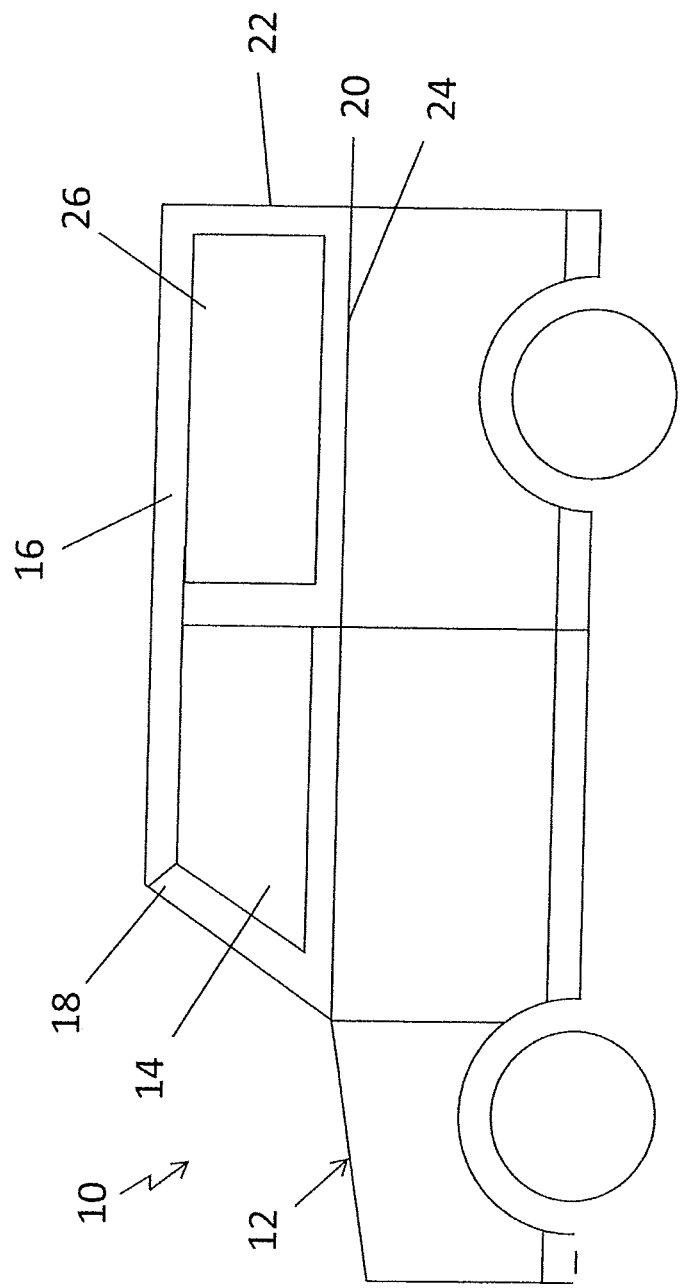
FIG. 1 shows a schematic side view of a vehicle configured as a sports utility vehicle having a convertible top and a side window arrangement.
Figure 2:
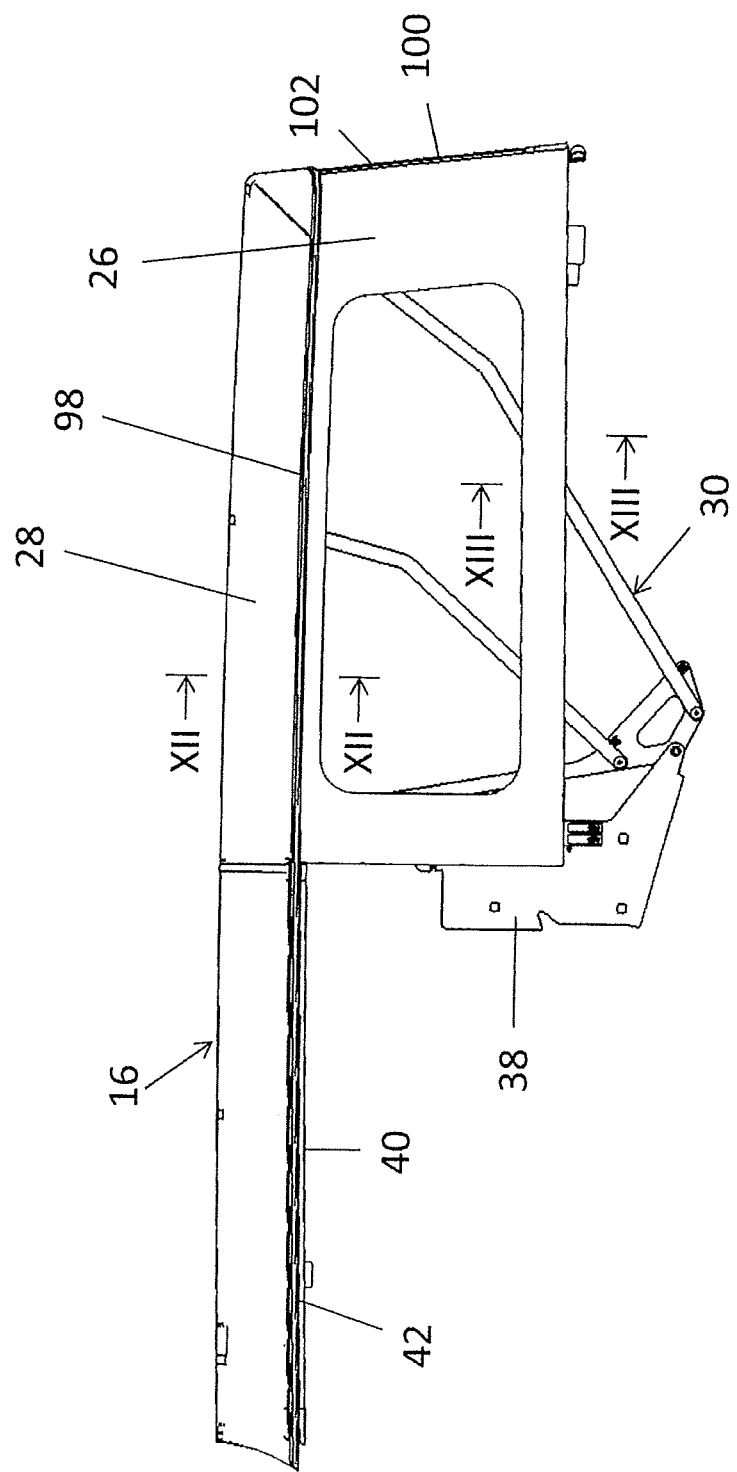
FIG. 2 shows a side view of the top cover together with the side window arrangement.
Figure 3:
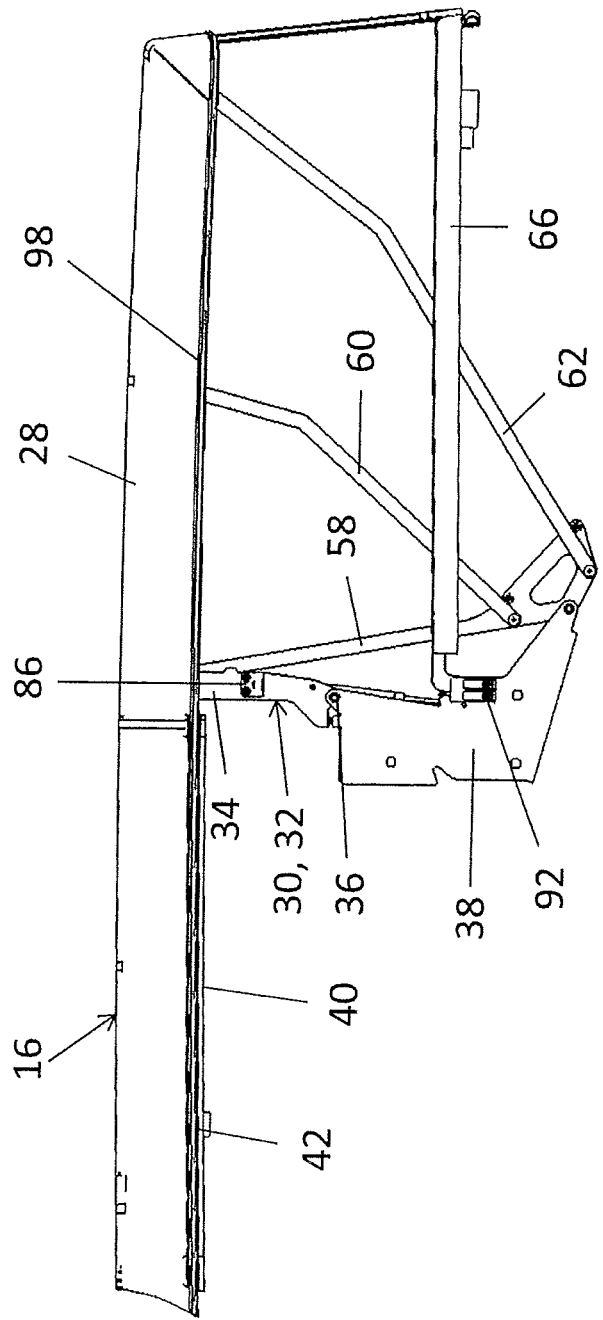
FIG. 3 shows a view corresponding to FIG. 2, but with the side window arrangement removed.

The drawing shows a passenger vehicle 10 which is configured as a sports utility vehicle and has a vehicle body 12 having a cabin 14 which encloses a vehicle interior and which can be closed at the top using a convertible top 16. In the closed position, which is illustrated in FIGS. 1 to 3, the convertible top 16 extends between a front cowl 18, which forms an upper leg of a windscreen frame and extends in the transverse direction of the vehicle, and a rear-side edge 20 which extends in the transverse direction of the vehicle and which is disposed at the level of a belt line 24 in the area of the vehicle rear. Furthermore, the vehicle 10 comprises a side window arrangement 26 on either side in its rear-side portion, each side window arrangement 26 being formed by a side panel and laterally limiting a cargo space of the vehicle associated to the vehicle interior.

Figure 4:
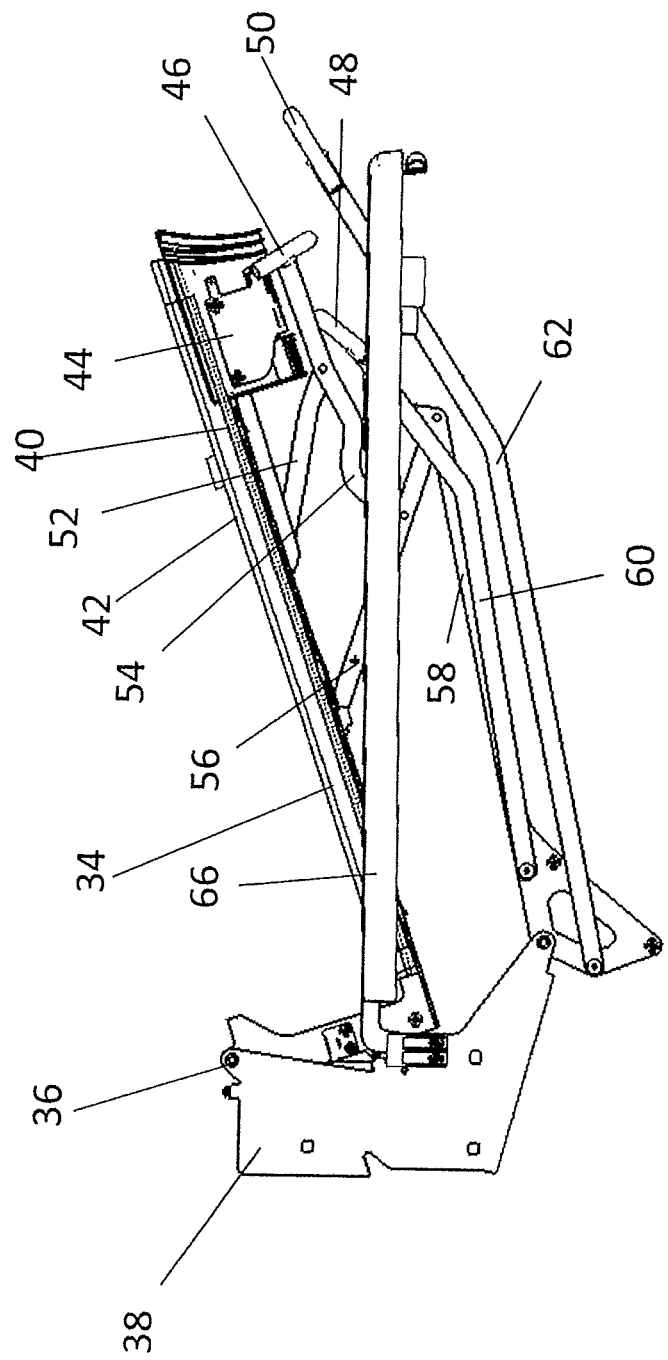
FIG. 4 shows a view of the convertible top corresponding to FIG. 3, but with the convertible top in a storage position and without showing a top cover.

The convertible top 16 comprises a top cover 28 which can be displaced by means of a top linkage 30, allowing the vehicle interior to be selectively opened or closed toward the top. For this purpose, the top linkage 30 can be displaced between a closed position, which is illustrated in FIGS. 1 to 3 and in which the vehicle interior is covered by the top cover 28, and a storage position, which is illustrated in FIG. 4 and in which the vehicle interior is open toward the top and the top 16 is stored in a rear-side storage space of the vehicle body 12, which is formed by the cargo space.

The top linkage 30 comprises a link arrangement 32 on either side of a vertical longitudinal center plane of the vehicle, each link arrangement 32 having a main link 34 which is L-shaped and the short leg of which is pivotably mounted on a respective vehicle-attached main bearing 38 via a hinge point 36. When the top linkage 30 is in the closed position, a long leg of the main link 34 forms a roof side beam 40 which carries a weather strip 42. In the closed position, the front-side end of the main link 34 reaches a front cowl 18 of the vehicle body 12.

A front bow 44, via which the convertible top 16 can be fixed to the front cowl 18 when in the closed position, and transverse bows 46, 48 and 50, which are pivotably mounted via bow links 52, 54, 56, 58, 60 and 62, extend between the bilaterally disposed link arrangements 32. A tensioning bracket 66 is attached to the bilaterally disposed main bearings 38, said tensioning bracket 66 extending at the level of the belt line 24 and surrounding the cargo space, i.e. the vehicle interior, of the vehicle 10 at the rear.

Figure 5:
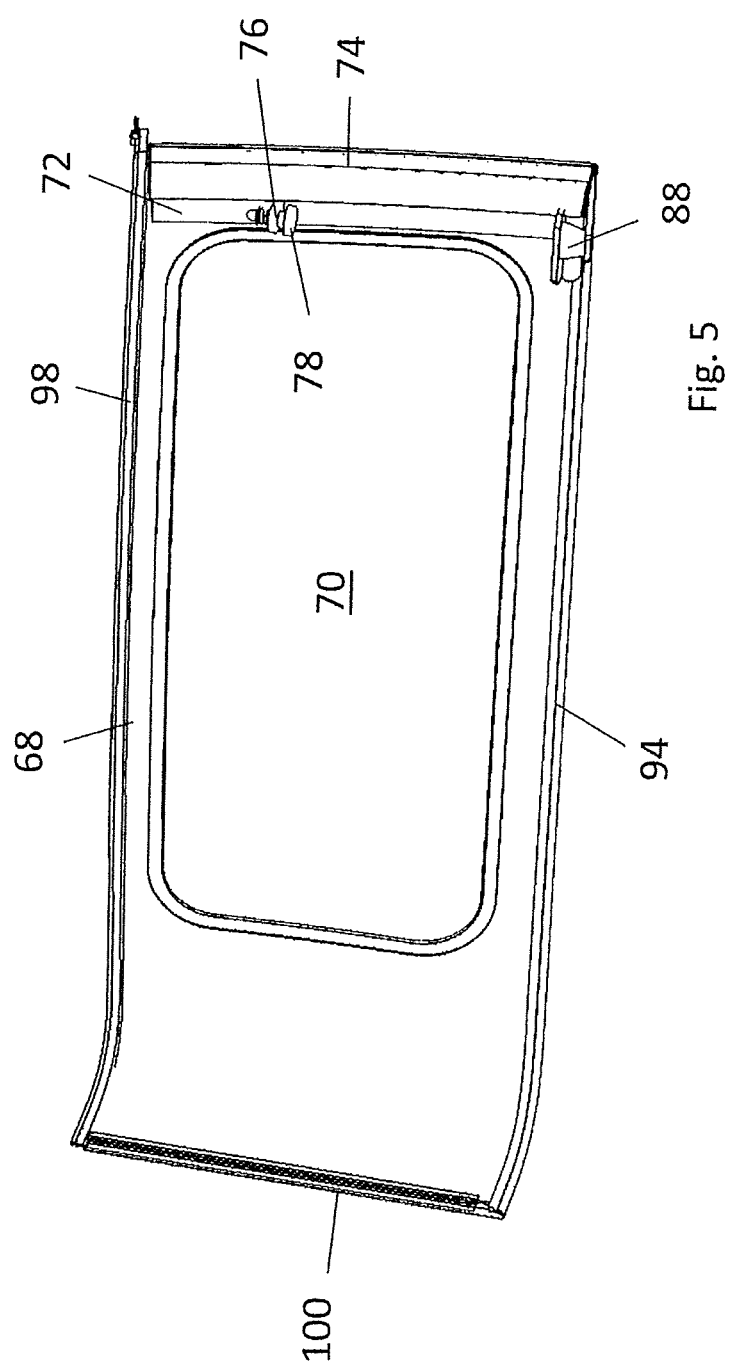
FIG. 5 shows an interior view of the side window arrangement.
Figure 6:
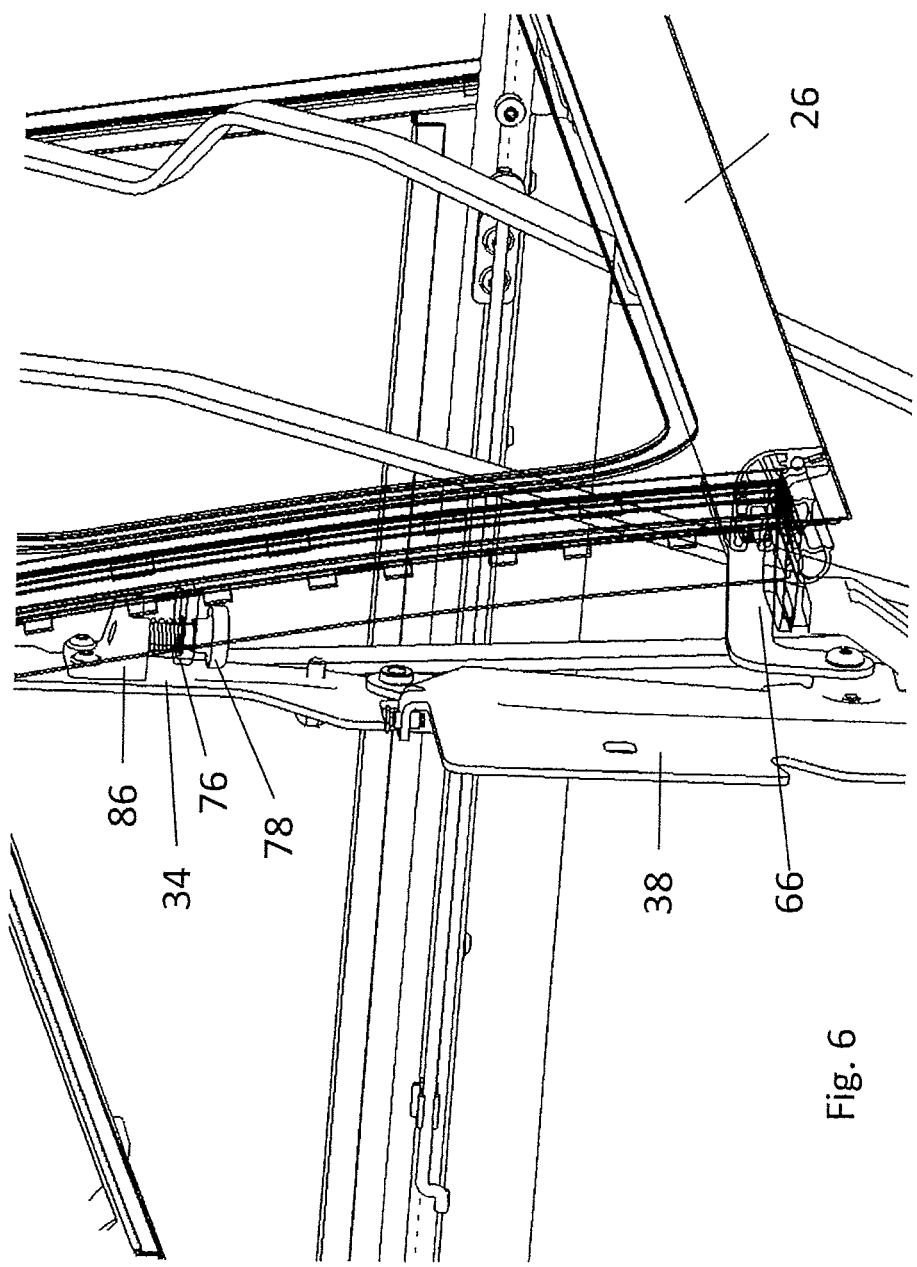
FIG. 6 shows a perspective front view of an attachment portion of the side window arrangement.
Figure 7:
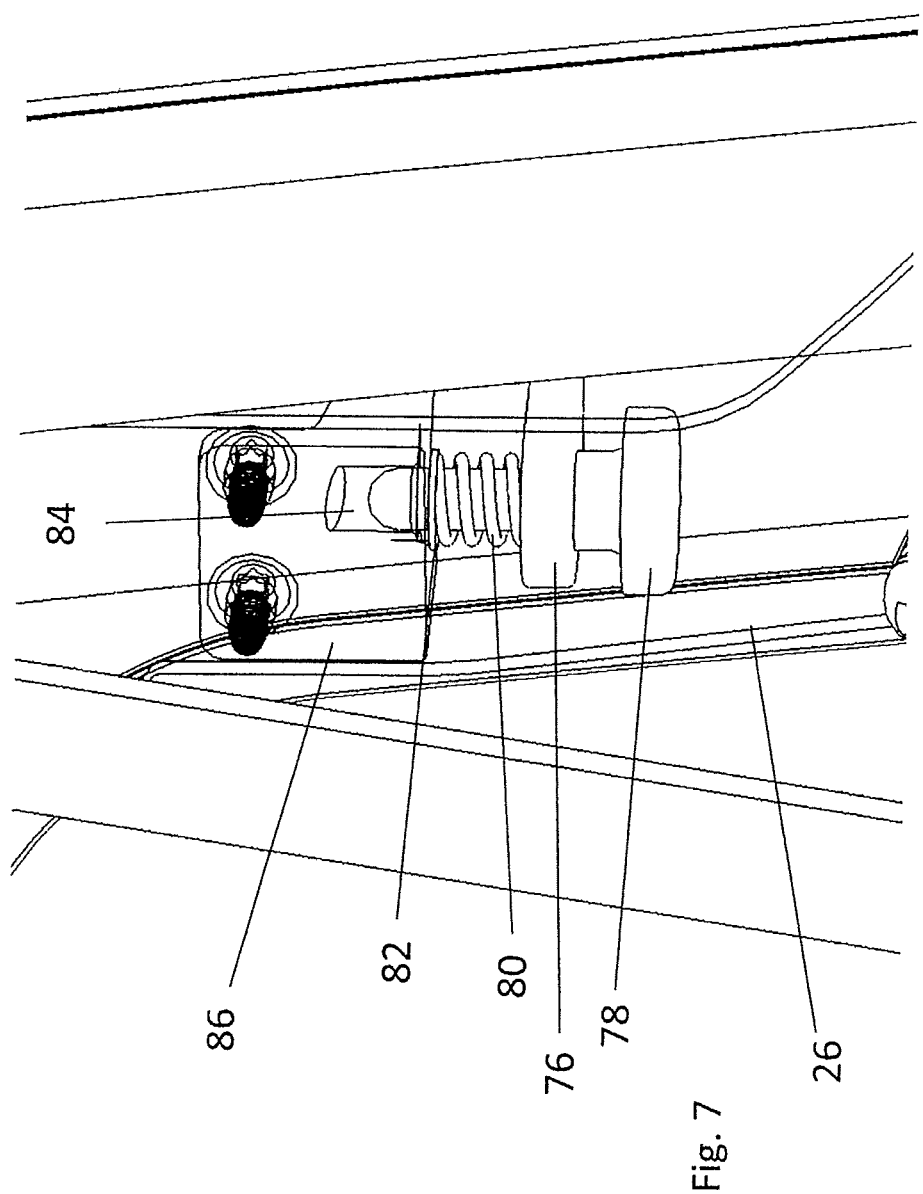
FIG. 7 shows an enlarged illustration of a manually unlockable locking device of the side window arrangement in its locked position.
Figure 8:
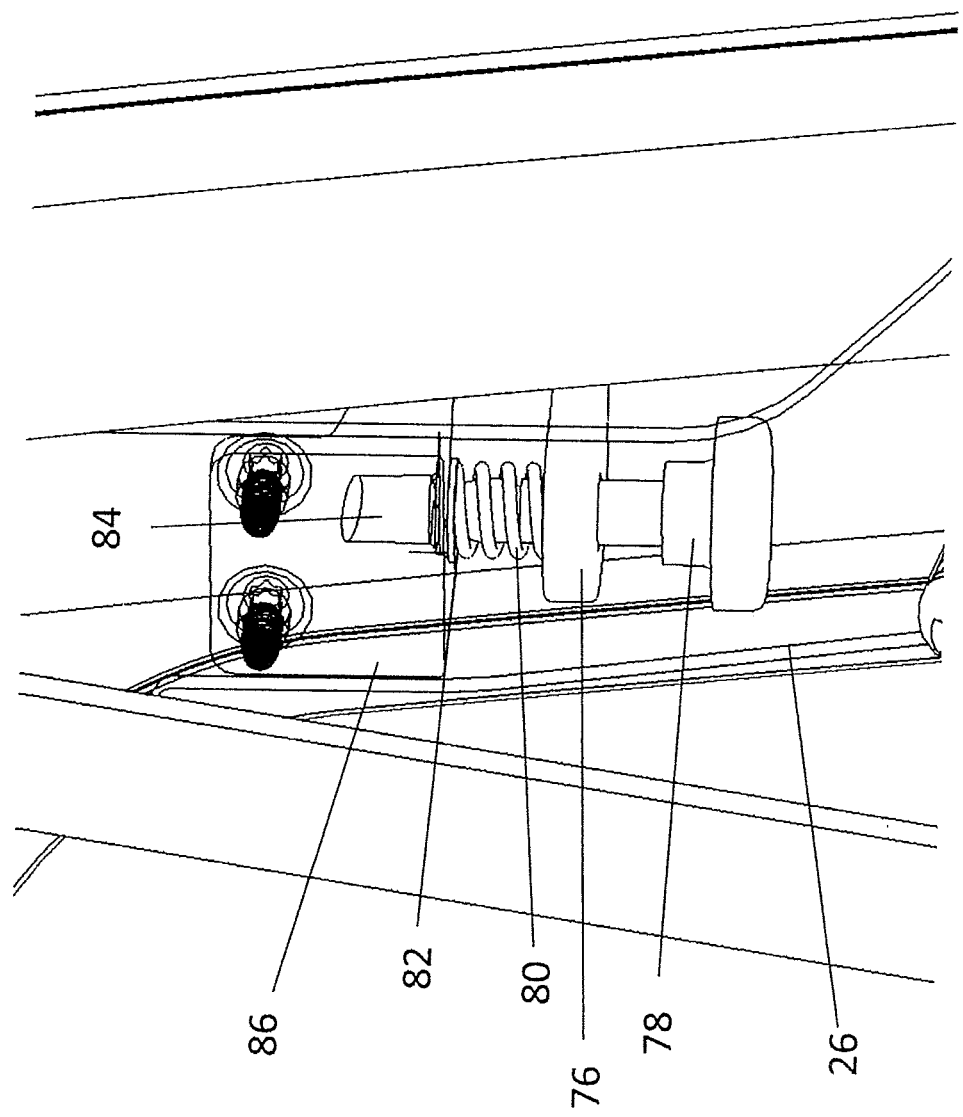
FIG. 8 shows a view corresponding to FIG. 7, but with the locking device in the unlocked position.
Figure 13:
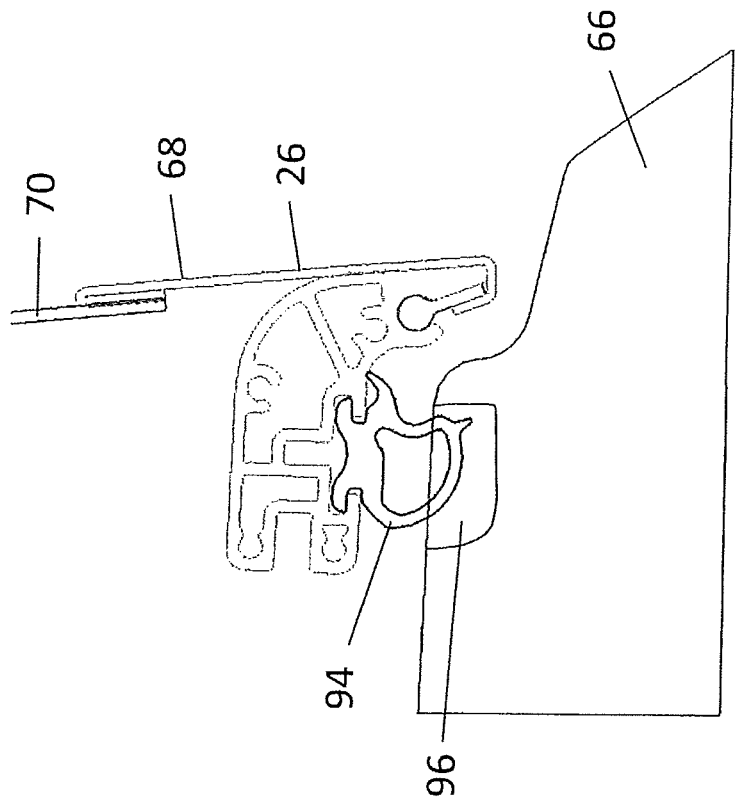
FIG. 13 shows a section through the side window arrangement and a tensioning bracket along line XIII-XIII in FIG. 2.
Figure 12:
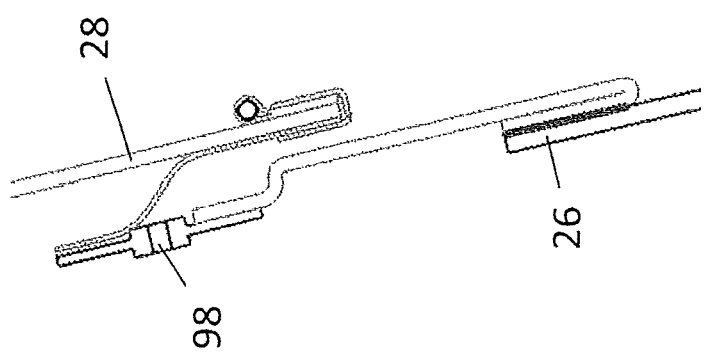
FIG. 12 shows a section through a transitional area between a top cover and the side window arrangement along line XII-XII in FIG. 2.

The bilaterally disposed side window arrangements 26, of which the one disposed on the left with respect to the forward direction of travel of the vehicle 10 is illustrated on its own in FIG. 5, each comprise an opaque frame portion 68, which encloses a transparent window portion 70. At its front-side edge, which extends in the vertical direction of the vehicle, the frame portion 68 is provided with a support 72 on which a weather strip 74 providing sealing against the vehicle body is disposed.

Furthermore, a bearing lug 76 is formed on the support 72, a locking pin 78 pre-loaded into a locking position by means of a spring device 80 formed by a coil spring being mounted on said bearing lug 76. For this purpose, the spring device 80 bears against the bearing lug 76 on one side and against a ring collar 82 of the locking pin 78 on the other side.

The locking pin 78, which has a knob, interacts with a recess or seat 84 formed at an underside of a locking counterpart 86 which is disposed on the short leg of the main link 34.

A pin 88 which points downward when in the mounted position is disposed in the lower end portion of the support 72, said pin 88 being a positioning means (positioning device) which, when the side window arrangement 26 is in the mounted position, engages into a blind hole-type seat 90 formed on a support element 92 which is disposed on an outer side of the main bearing 38.

At its lower edge, the side window arrangement 26 is provided with a weather strip rib 94 which engages into a top-side groove 96 of the tensioning bracket 66 when the side window arrangement 26 is in the mounted position.

At its upper edge, the side window arrangement 26 has a zip 98, via which it is attached to a lower edge of the top cover 28 when in the mounted position.

At its rear-side edge, the side window arrangement 26 has another zip 100, which is connected to a vehicle rear element 102, which can be formed by the top cover 28 and can accommodate a rear window.

The side window arrangement 26 is demounted in the manner described below.

In a first step, the side window arrangement 26 is separated from the vehicle rear element 102 by opening zip 100 and from the top cover 28 by opening zip 98. Then, the mushroom-like locking pin 78, which is provided with the knob, is pulled against the force of the spring device 80, whereby the side window arrangement is unlocked from the locking counterpart 86. The side window arrangement 26 can now be tilted outward, i.e. away from the vertical longitudinal center plane. Then, the side window arrangement 26 can be lifted, causing the pin 88 to disengage from the seat 90 and the weather strip rib 94 to disengage from the groove 96 of the tensioning bracket 66. The weather strip rib 94 can also be configured as a sliding profile, in which case it is pulled from the groove 96 in the longitudinal direction of the vehicle for demounting.

The side window arrangement 26 is mounted in the analogously reverse manner. That is, first, the weather strip rib 94 is disposed in the groove 96 of the tensioning bracket. Then, the side window arrangement 26 is pivoted inward, whereby the pin 88, which has a wedge-shaped cross-section, is guided into the funnel-shaped seat 90 and the locking pin 78 snaps into the seat 84 of the locking counterpart 86. Then, the zips 98 and 100 can be closed so as to fix the side window arrangement 26 to the top cover 28 and to the vehicle rear element 102.

The invention claimed is:

1. A vehicle, comprising a vehicle body which is provided with a manually removable side panel at a longitudinal side of the vehicle, and a top having a top linkage which comprises a link arrangement on either side of a vertical longitudinal center plane of the vehicle, each link arrangement being pivot-ably mounted on a respective vehicle-attached main bearing, wherein the re-movable side panel is secured to at least one element of the top linkage by a manually unlockable locking device; and
    wherein the locking device comprises a coil spring-loaded locking pin which is pre-loaded into a locking position by a spring device.
2. The vehicle according to claim 1, wherein the locking device comprises a locking counterpart.

3. The vehicle according to claim 1, wherein the side panel comprises a positioning device which is engaged with a vehicle-attached seat.

4. The vehicle according to claim 3, wherein the positioning device is a pin.

5. A vehicle, comprising a vehicle body which is provided with a manually removable side panel at a longitudinal side of the vehicle, and a top having a top linkage which comprises a link arrangement on either side of a vertical longitudinal center plane of the vehicle, each link arrangement being pivot-ably mounted on a respective vehicle-attached main bearing, wherein the re-movable side panel is secured to at least one element of the top linkage by a manually unlockable locking device; and
    wherein the locking device comprises a spring-loaded locking pin which is pre-loaded into a locking position by a spring device;
    wherein the side panel comprises a positioning device which is engaged with a vehicle-attached seat; and
    wherein the seat is disposed on the respective main bearing.

6. The vehicle according to claim 1, wherein at its lower edge, the side panel is positioned on the vehicle body via a rib/groove connection.

7. A vehicle, comprising a vehicle body which is provided with a manually removable side panel at a longitudinal side of the vehicle, and a top having a top linkage which comprises a link arrangement on either side of a vertical longitudinal center plane of the vehicle, each link arrangement being pivot-ably mounted on a respective vehicle-attached main bearing, wherein the re-movable side panel is secured to at least one element of the top linkage by a manually unlockable locking device;
    wherein at its lower edge, the side panel is positioned on the vehicle body via a rib/groove connection; and
    wherein the groove is disposed on a rear-side tensioning bracket which is mounted on the bilaterally disposed main bearings.

8. The vehicle according to claim 1, wherein at its upper edge, the side panel has a fixing device for being attached to a top cover.

9. The vehicle according to claim 8, wherein the fixing device comprises a zip.

10. The vehicle according to claim 1, wherein at its rear-side edge, the side panel comprises an attaching device for being connected to a vehicle rear element.

11. The vehicle according to claim 10, wherein the attaching device comprises a zip.

12. The vehicle according to claim 1, wherein the side panel is a side window arrangement.

13. The vehicle according to claim 2, wherein the locking counterpart is disposed on a link.

14. The vehicle according to claim 13, wherein the link is a main link of the respective link arrangement.

\* \* \* \* \*